United States Patent
Sprangle et al.

(10) Patent No.: US 8,681,173 B2
(45) Date of Patent: Mar. 25, 2014

(54) DEVICE, SYSTEM, AND METHOD FOR IMPROVING PROCESSING EFFICIENCY BY COLLECTIVELY APPLYING OPERATIONS

(75) Inventors: Eric Sprangle, Austin, TX (US); Anwar Rohillah, Austin, TX (US); Robert Cavin, San Francisco, CA (US); Tom Forsyth, Kirkland, WA (US); Michael Abrash, West Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 930 days.

(21) Appl. No.: 11/967,492

(22) Filed: Dec. 31, 2007
(Under 37 CFR 1.47)

(65) Prior Publication Data
US 2009/0171994 A1 Jul. 2, 2009

(51) Int. Cl.
*G09G 5/00* (2006.01)

(52) U.S. Cl.
USPC .................................................. 345/606

(58) Field of Classification Search
USPC ................................. 345/606–610
See application file for complete search history.

(56) References Cited

U.S. PATENT DOCUMENTS

| | | | | |
|---|---|---|---|---|
| 5,880,736 A | * | 3/1999 | Peercy et al. | 345/426 |
| 6,525,722 B1 | * | 2/2003 | Deering | 345/419 |
| 7,372,990 B2 | * | 5/2008 | Yamauchi et al. | 382/166 |
| 2004/0139138 A1 | * | 7/2004 | Chen et al. | 708/523 |
| 2005/0114632 A1 | | 5/2005 | Kottapalli | |
| 2006/0098019 A1 | * | 5/2006 | Tarditi et al. | 345/505 |

OTHER PUBLICATIONS

AMD64 Technology 128-Bit SSE5 Instruction Set, Publication No. 43479, Revision 3.01, Aug. 2007 pp. 3, 4, 9, and 39-41.
David Tanqeray, The Cray X1 and Supercomputer Roadmap, Dec. 2002, pp. 7 & 18.
Roger Espasa et al., Tarantula: A Vector Extension to the Alpha Architecture, Aug. 2002.

* cited by examiner

*Primary Examiner* — Aaron M Richer
(74) *Attorney, Agent, or Firm* — Mnemoglyphics, LLC; Lawrence M. Mennemeier (57) ABSTRACT

A system and method for generating a single compressed vector including two or more predetermined attribute values. For each of a plurality of data points such as pixels, if a first and a second attribute values of the data point are equal to a first and a second, respectively, of the two or more predetermined attribute values, the compressed vector is used to operate on the data point. Other embodiments are described and claimed.

26 Claims, 6 Drawing Sheets

DEVICE, SYSTEM, AND METHOD FOR IMPROVING PROCESSING EFFICIENCY BY COLLECTIVELY APPLYING OPERATIONS

BACKGROUND OF THE INVENTION

Certain operations may dominate computational efforts during data processing. For example, some processes may individually apply operations to each data element in a data set. Such operations may use a large number of operation cycles using a large amount of computational effort and time for processing each element in the set individually.

For example, operations, such as pixel shading, may be used to visually enhance or increase quality or realism in digital images. However, applying the effects to an image may dominate computational efforts for processing the pixels therein (e.g., using 40% to 90% of total pixel processing computational effort). Typically, graphics functions calculate and/or apply effects, for example, by interpolation, individually for each pixel. Interpolation may include constructing new or altered data points or pixels from a set of known data points.

A need exists for a more efficient way to apply operations to a set of data elements.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

The present invention may be used in a variety of applications. Although the present invention is not limited in this respect, the circuits and techniques disclosed herein may be used in many apparatuses such as personal computers (PCs), wireless devices or stations, video or digital game devices or systems, image collection systems, processing systems, visualizing or display systems, digital display systems, communication systems, and the like.

Figure 1:
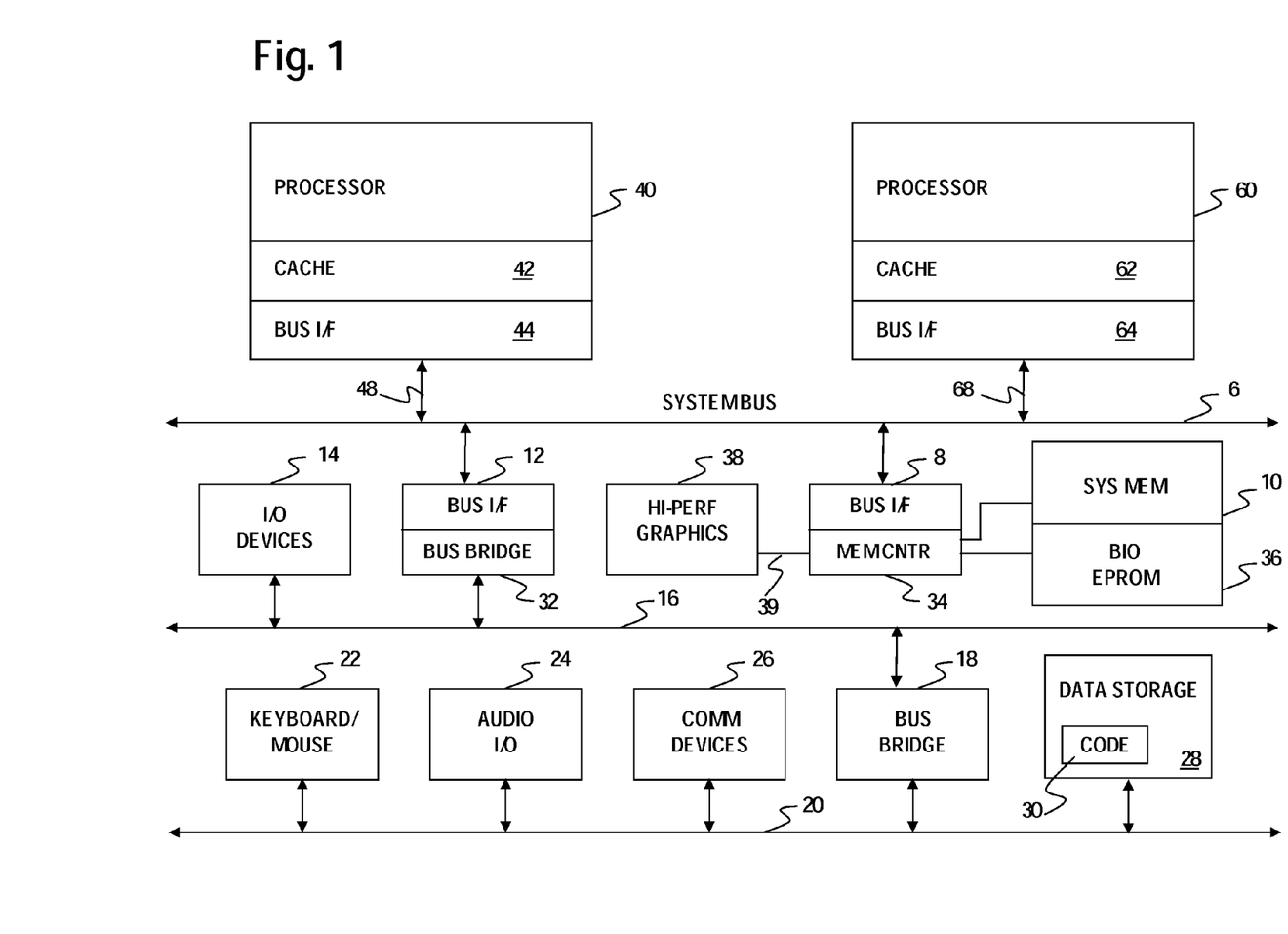
FIGS. 1 and 2 are schematic illustrations of computing systems according to embodiments of the invention.
Figure 2:
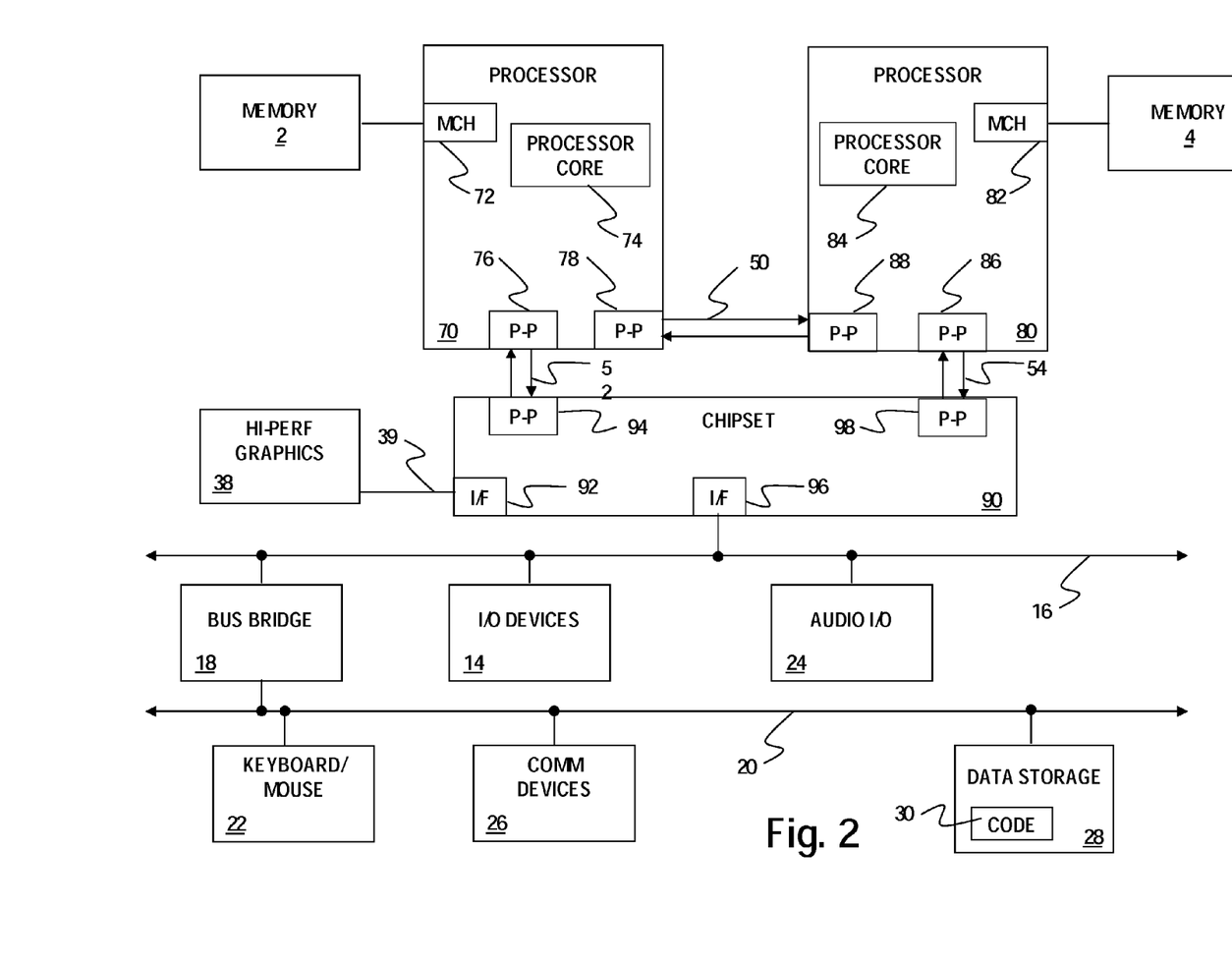

Reference is made to FIGS. 1 and 2, which schematically illustrate computing systems according to embodiments of the invention. The system in FIG. 1 includes processors, memory, and input/output devices interconnected by a front side bus and/or a system bus, whereas system in FIG. 2 shows a system were processors, memory, and input/output devices are interconnected by a number of point-to-point interfaces. Other processor architectures may be used, and other methods of communicating data within a processor may be used. Other numbers of processors than shown may be used, such as one.

The system in FIG. 1 may include one or several processors, of which only two, processors 40 and 60 are shown for clarity. In other embodiments only one processor may be used. Processors 40 and 60 may include level one caches 42, 62. The system in FIG. 2 may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other buses may be used.

Memory controller 34 may permit processors 40, 60 to read and write to and from system memory 10 and from a basic input/output system (BIOS) erasable programmable read-only memory (EPROM) 36. Other components may perform such functions and other internal and external memories may be used. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port (AGP) interface. Memory controller 34 may direct read data from system memory 10 to the high-performance graphics circuit 38 across high-performance graphics interface 39.

The system in FIG. 2 may also include one or several processors, of which only two, processors 70, 80 are shown for clarity. Processors 70, 80 may each include a local memory channel hub (MCH) 72, 82 to connect with memory 2, 4. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 1 system, bus bridge 32 may permit data exchanges between system bus 6 and bus 16, which may in some embodiments be an industry-standard architecture (ISA) bus or a peripheral component interconnect (PCI) bus. In the FIG. 2 system, chipset 90 may exchange data with a bus 16 via a bus interface 96. In either system, there may be various input/output I/O devices 14 on the bus 16. I/O devices 14 may include an output unit, e.g., a cathode ray tube (CRT) monitor, liquid crystal display (LCD) monitor, or other suitable monitor or display (e.g., display 200, described in reference to FIG. 4) for providing a user interface for displaying images and the effects, features, attributes, underlying pixilated scheme or lattice, options, or results thereof, for example, to a viewer or user. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include for example keyboard and cursor control devices 22, including an input unit, e.g., a keyboard, mouse, touch-pad, or other suitable pointing or input device for accepting input, alterations and/or selections, for example, from a user, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

Embodiments of the invention may include a computer readable medium, such as for example a memory, a disk drive, or a universal serial bus (USB) flash memory, or the various storage and memory devices shown in FIGS. 1 and 2, including or having stored thereon instructions which when executed by a processor or controller, carry out methods disclosed herein. Processors 40, 60, 70, and/or 80 may include, for example, a central processing unit (CPU), a graphics processing unit (GPU), a digital signal processor (DSP), a microprocessor, a host processor, a plurality of processors, a controller, a chip, a microchip, or any other suitable multi-purpose or specific processor or controller. Processors 40, 60, 70, and/or 80 may use a computer architecture, micro-architecture, and/or an instruction set architecture (ISA) (e.g., a "x86" ISA) for operating program elements, such as, for example, native data types (e.g., having the format and precision values in which the processors handle internally), instructions, registers, addressing modes, memory architecture, interrupt and exception handling, and external I/O. The ISA may execute a set of instructions using processor pipeline (s) (e.g., as described herein, in reference to FIG. 3) for applying to a set of data elements (e.g., pixels in an image) operations or effects (e.g., realism, bump mapping, shadows, and explosion effects in graphics processing systems). In one embodiment, data elements or points may include pixels and operations may include graphics effects such as pixel shading. However, data elements may refer to any data object of any size and/or for any use.

In some embodiments, the systems in FIG. 1 and/or 2 may include or may be, for example, a computing system, e.g., a personal computer, a desktop computer, a mobile computer, a laptop computer, a terminal, a workstation, a server, a personal digital assistant (PDA), a network device, a cellular phone, a camera, or any other suitable computing and/or communication device.

Figure 3:
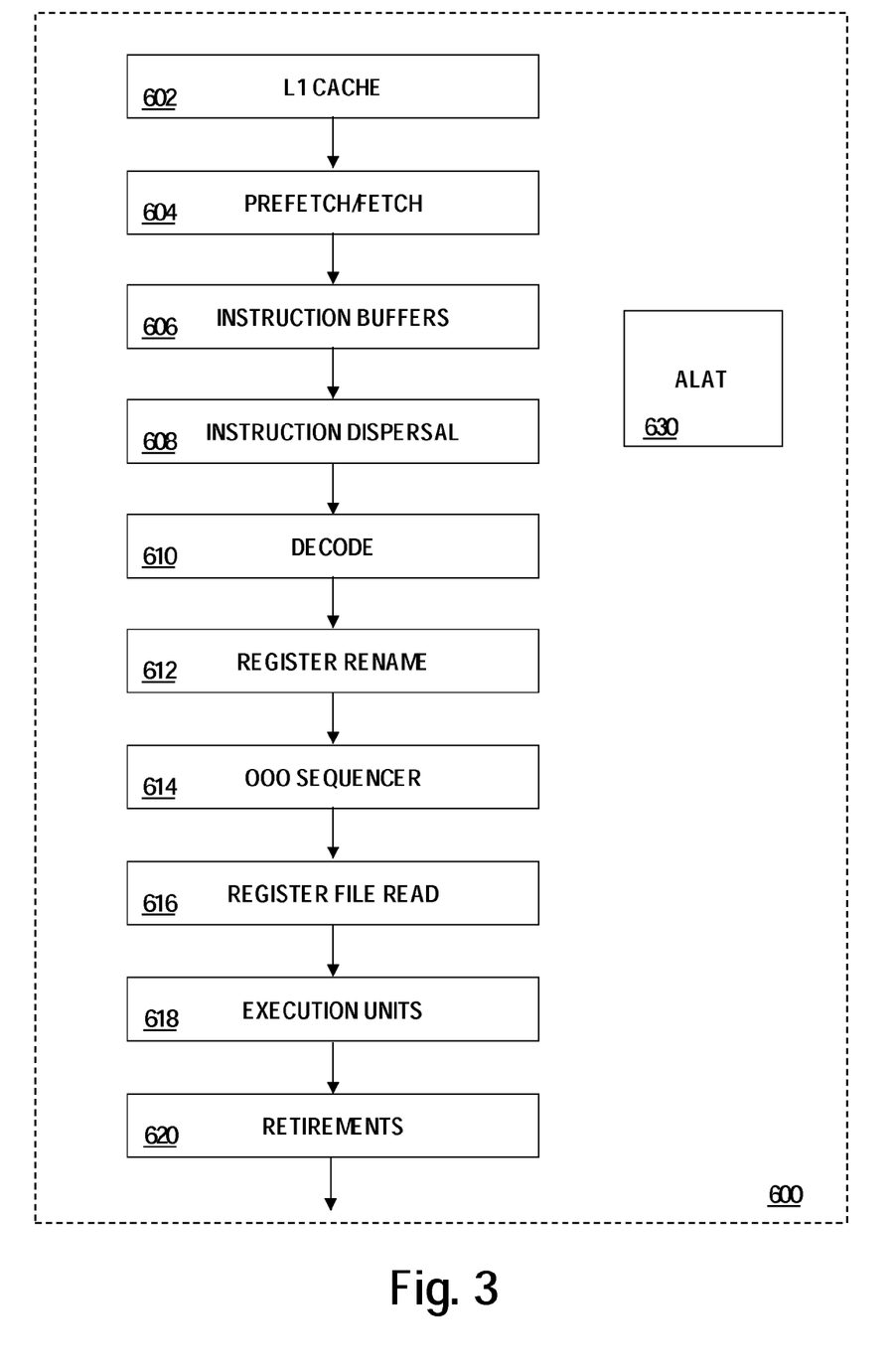
FIG. 3 is a block diagram of stages in a processor pipeline according to an embodiment of the invention.

Reference is made to FIG. 3, which is a block diagram of stages in a processor pipeline according to an embodiment of the invention. Processor pipeline 600 may be operated by the processors of FIG. 1 or 2, or other processors according to embodiments of the invention. Processor pipeline 600 may be an out-of order pipeline. Other pipeline components or mechanisms may be used.

A level one (L1) cache stage 602 may store instructions in a level one (L1) cache. A prefetch/fetch stage 604 may fetch and/or prefetch the instructions from the level one (L1) cache or another location. An instruction buffers stage 606 may temporarily keep or buffer the instructions in one or more buffers. An instruction dispersal stage 608 may send the instructions down the pipeline. A decode stage 610 may take an instruction from a program and produce one or more machine instructions. A register rename stage 612 may map logical registers over to actual physical registers prior to execution. An out-of-order (OOO) sequencer stage 614 may schedule the various machine instructions for execution, for example, based upon the availability of data, for example, in source registers. Those instructions whose source registers are waiting for data may have their execution postponed, whereas other instructions whose source registers have their data available may have their execution advanced in order. In some embodiments, they may be scheduled for execution in parallel.

A register file read stage 616 may read the physical (e.g., source) registers. An execution units stage 618 may input the machine instructions into one or more execution units. The advanced load address table (ALAT) stage 630 may modify entries while executing machine instructions, such as, advanced load instructions, corresponding test instructions, and any intervening store instructions. A retirement stage 620 may update the machine state and write to physical destination registers.

The pipeline stages shown in FIG. 3 are one example only, and may vary in both function and sequence in various processor pipeline embodiments. A processor used with embodiments of the invention need not use pipelining.

In conventional systems, operations typically input vectors for data elements in an image to operate on, calculate, interpolate, and/or apply effects individually to each of the data elements. A vector may be applied to a data element to modify the data element, for example, applying an operation (e.g., graphics or pixel shading effects). For example, a vector may be applied to a data element or point by multiplying the vector and the data point and/or generating a vector product of the vector and the data point. Depending on the size of a set of data elements, a large number of data elements may be operated on. For example, for some images (e.g., depending on the image resolution), an excess of 2 million pixels may be operated on, for example, rendered, lit, shaded, and colored, for each frame. Embodiments of the invention provide instructions that applying operations or effects in fewer iterations or operational cycles (e.g., using fewer input vectors) and collectively for two or more pixels or data elements, for example, having common features or attribute values, for decreasing the operational computation or processing effort. Other or different benefits maybe realized.

Figure 4:
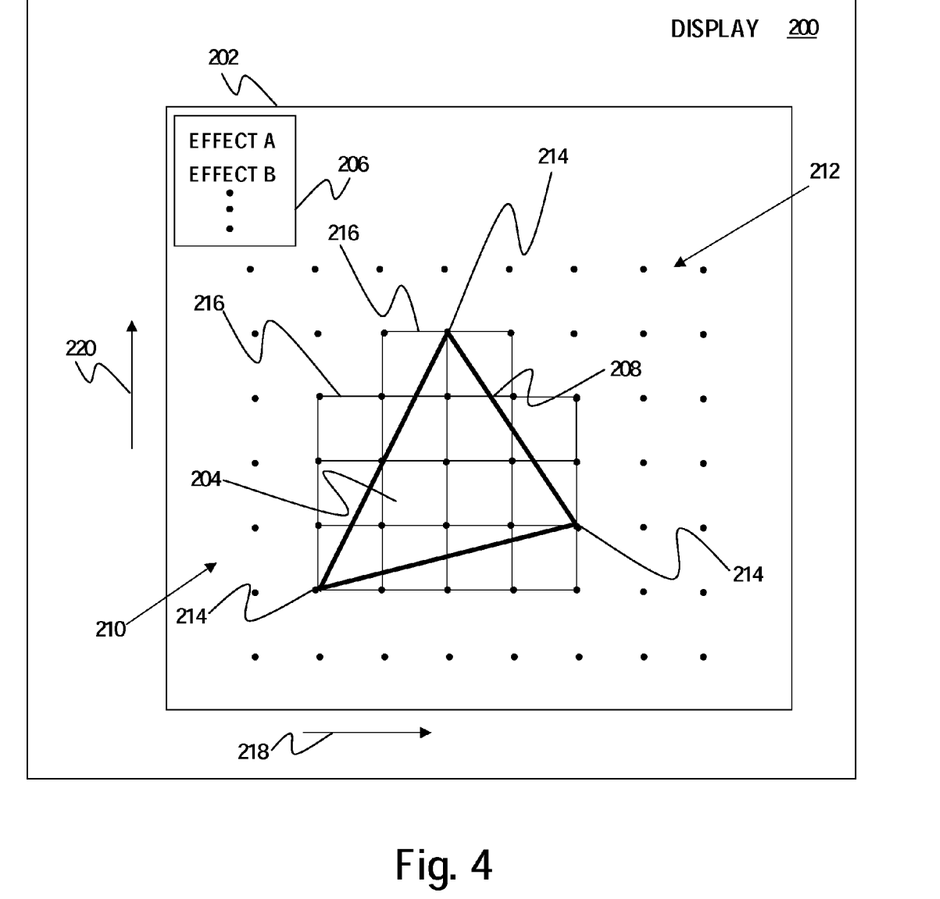
FIG. 4 is a schematic illustration of a user interface of a display for applying operations collectively to a plurality of selected data elements according to an embodiment of the invention.

Reference is made to FIG. 4, which schematically illustrates a user interface 202 of a display 200 for selecting and displaying a plurality of data elements 204 with which to collectively apply operations 206 according to an embodiment of the invention. A set of data elements 210 may be viewable or displayed (e.g., to a user) on user interface 202 of display 200. Set of data elements 210 (e.g., an image or pixilated object) may include a plurality of data elements 212 (e.g., pixels) arranged for example, in a group, for example, a lattice, grid or other collection of data elements. Set of data elements 210 may be further partitioned into groups 216, each of which may include two or more data elements and may be subsets of set of data elements 210. Data elements 212 within each of groups 216 may have approximately the same attribute value. Processors 40, 60, 70, and/or 80, or other processors, may manipulate, alter, use, or process data elements 212 in groups 216 collectively, and/or in unison or sequence.

Each data element 212 may be defined, for example, by a coordinate set (x, y), where x and y may represent the position of the data element along an x-axis 218 and a y-axis 220, respectively, of set of data elements 210. Each data element 212 may be defined, for example, by a plurality of features or attribute values (e.g., A, B, and C). Other defining parameters, measures, numbers, units, or sequences may be used. Attribute values may include, for example, integer or floating point (FP) values, describing one or more red green and blue (RGB) color values, an intensity value, or other values commonly describing data elements or image units. Other or different attributes may be used.

In one embodiment, a set of instructions (e.g., selected and/or designed by a user, or program or application) may be executed to modify set of data elements 210 by applying operations 206 to selected data elements 204. In one embodiment, processors 40, 60, 70, and/or 80, or other processors (e.g., using an application or software engine) may select data elements 204. In another embodiment, a user may select data elements 204. The user may select elements, for example, individually, e.g., by marking a data element with an input device, such as a mouse or cursor, or entering coordinate values for the data element on user interface 202. The user may select elements collectively by for example selecting groups of or multiple data elements 204, e.g., by highlighting, drawing, selecting, or marking a region 208 (e.g., such as a triangle or square) of set of data elements 210 or a pixilated image on user interface 202.

In one embodiment, one of operations 206 (e.g., graphics effect such as a pixel shader or fragment shader effect or other pixel processing effects) may be selected by a processor (e.g., one or more of processors 40, 60, 70, and/or 80) from among a plurality of operations 206, such as, graphics effects. The processor may apply selected operations 206 to each of selected data elements 204 (e.g., inside of marked region 208). Operations 206 may include, for example, graphics effects, pixel shading, realism, bumps, mapping, shadows, three-dimensional (3D) image rendering, animation, explosion effects or other effects. Selected data elements 204 may be marked or manipulated according to an operational mechanism (e.g., which may be different for each different operation 206).

In one embodiment, operations 206 may be applied to each selected pixel or data element 204 (e.g., defined by coordinate values such as x and y) by inputting attribute values (e.g., A, B, and C) and altering the attribute values according to operation 206 (e.g., defined by a set of instructions). In one embodiment, the attribute values are input and altered by an interpolation algorithm. For example, in conventional systems, a single or individual attribute value may be input into an algorithm for each data element. The vectors may include or represent the specific attribute values of the data element for which the vector is generated. Thus two identical vectors may be generated for data elements having the same attribute values.

According to embodiments of the invention, each of the (e.g., three or four) data elements 214 at the vertices of the marked region 208 (e.g., a triangle or square, respectively) may have approximately the same attribute values (e.g., A, B, and C) as that of each of selected data elements 204. In some embodiments, the attribute values of data elements 214 at the vertices of the marked region 208 may be used as predetermined attribute values to represent the approximately equivalent attribute values of each of data elements 204 inside marked region 208. A single vector may be created to operate on one region having multiple data elements. In one embodiment, instead of individually generating and/or inputting a vector specifically for each of selected data elements 204 for processing the data element 204, a processor may use a single compressed vector representing multiple attribute values. The compressed multiple attribute vector may represent predetermined representative attribute values (e.g., of data elements 214). Since the same predetermined attribute values may be input for each of selected data elements 204, the same single vector may be used to alter each of selected data elements 204. Other or additional vectors may be used.

Furthermore, since data elements in group 208 may have two or more common attribute values, a single compressed vector may be used to alter the two or more attribute values (e.g., using a fused multiple-add (MADD) architecture implemented as a vector structure, as described herein). In contrast, conventional mechanisms may use a different vector for each different attribute value. MADD instructions or operations may include a fusion of multiply and add vectors evaluated or applied, for example, in a single instruction issue or operational cycle.

In one embodiment, a processor (e.g., processors 40, 60, 70, and/or 80) may apply operations 206 collectively to the plurality of selected data elements 204 by inputting the single compressed vector using a single set of representative and/or predetermined attribute values for each selected data element 204. In one embodiment, vectors may be input into an interpolation algorithm or set of instructions to calculate the interpolated values of attributes for each of data elements 204 (e.g., pixels). For example, the set of instructions may include evaluating, for example, the equation Ax+By+C, where x and y define coordinate or location values of each of data elements 204 (e.g., on the pixilated object 210 or user interface 202), and A, B, and C, are predetermined attribute values of each of representative data elements 214. For example, each data element 204 may have an attribute value interpolated by evaluating the equation Ax+By+C, where A is a RGB color value, B is an intensity value, and C is a contrast value. Other equations or different attribute values may be used. In one embodiment, applying operation 206 may include executing perspective correction on the interpolated attribute values for each of data elements 204, by evaluating the equation Ax+By+C, where x and y define coordinate values of each of data elements 204. For example, perspective correction may include mapping a (e.g., box-like) representation of a data set into a perspective view of a user.

A processor may apply an operation (e.g., including interpolating predetermined attribute values) collectively to a group of data elements in tiles or groups 216, for example, inside, partially inside, or overlapping marked region 208. For example, a processor may construct cells for partitioning the processing of a larger array of data, such as, set of data elements 210. The processor may process adjacent or overlapping groups 216 of data elements (e.g., 4×4 pixel tiles in an image). For interpolation, data elements in each of the groups 216 (e.g., 16 pixels in each of 4×4 pixel tiles in an image) may have the same attribute values for A, B, and C. Two or more of such common attribute values may be combined into a compressed attribute element or vector and processed collectively for operating on the common attributes to improve processing efficiency. Other number of data elements may be in groups, and the groups need not be symmetric or square.

Conventionally, some operations, such as, pixel shader effects, may individually input each of the values for A, B, and C to solve the equation Ax+By+C for interpolating attributes of each of data elements 204 in the groups 216 of marked region 208. For example, for a 4×4 pixel tile, a 16 unit wide vector operation using, for example, multiply and/or add units, may be applied for interpolating attributes of each pixel or data element, for example, as follows:

```
Dest = [A]*x;          // duplicate the 32 bit "A" value 16 times as input
Dest = Dest + [B]*y;   // duplicate the 32 bit "B" value 16 times as input
Dest = Dest + [C];     // duplicate the 32 bit "C" value 16 times as input
```

Assembly code corresponding to each of the above vector operations may be written, for example, as follows:

```
vmulps v0, v1, [A]{1to16}  ;; v1 = x
vmadd231ps v0, v2, [B]{1to16}  ;; v2 = y
vaddps v0, v0, [C]{1to16}  ;; v0 = Dest
```

Other or different operations, using other or different languages, may be used. Operations may use instructions including, for example, three unique sources (e.g., attribute values A, B, and C) and one destination pointer (e.g., a pointer to data stored in a memory). The sources (e.g., or attribute values) are typically used infrequently and may be stored in external or system memories 2, 4, 10, or other memories. Since only one of the sources may be retrieved from memory at a time, none of the conventional vectors may be combined, for example, using fused MADD operation hardware.

In conventional systems, since three or more unique sources (e.g., A, B, and C) and one destination pointer may be used for each instruction, and only three register pointers are typically encoded in local or register memory, one or more of the sources may be overwritten on each instruction execution. Since each input (e.g., attribute values A, B, or C) of the conventional vectors (e.g., vectors [A]*x, Dest+[B]*y, or Dest+[C]), respectively may be reused, an overwritten source (e.g., one of attribute values A, B, or C) may result in a computational burden of an extra load or move to recover the overwritten source.

Embodiments of the invention may compress, group, or fuse two or more single attribute vectors (e.g., vectors [A]*x and Dest+[C])) into a single compressed multiple attribute vector (e.g., [A]*x+[C]), which is discussed in further detail herein. A processor may input the compressed multiple attribute vector (e.g., representing two or more single attribute values) to execute operations for two or more attribute values collectively or in one less operation cycle.

Each of the data elements in the groups 216 of marked region 208 may have attribute values common (e.g., approximately the same) with each other data element (e.g., attribute values A, B, and C may be attributes common to all data elements in groups 216). For each operation applied to data elements across the groups of marked region 208, two or more inputs vectors (e.g., representing attribute values A, B, and C) may be common to all data elements in each of groups 216 of marked region 208.

According to embodiments of the invention, a processor may input a single compressed multiple attribute vector representing two or more attribute values common to each of data elements 204. This may for example reduce processing effort, time, and/or operational cycles. For example, the two or more attribute values common to each of data elements 204 may have values approximately equal to representative attribute values (e.g., of data points 214). Other or additional values, vectors, or data may be used.

The same compressed vector may be iteratively input (e.g., with changing coordinate values) into a set of instructions for operating on each of data elements 204 (e.g., defined by the coordinate values) in marked region 208 or groups 216. In one embodiment, a different compressed vector may be generated and of used for each different group 216 or marked region 208 may have a different. In another embodiment, the same compressed vector may be used for multiple groups 216 or marked regions 208 when the data points 204 therein have approximately the same attribute values. The compressed vectors may be stored in local memory for relatively fast access (e.g., during the reiterative use). The modified data elements resulting from inputting the compressed multiple attribute vector for operating on each data element having common attribute values may be displayed to a user, for example, via user interface 202 and/or on display 200, such as a monitor or screen, or saved to a memory. For example, an image having graphics functions applied to it may be displayed to a user.

The attributes may include, for example, color, depth, location, etc. The attribute values of elements 214 (e.g., at the vertices of region 208) may be linearly interpolated to determine the attribute values between elements 214 (e.g., within region 208). According to some embodiments of the invention, when two or more multiple attribute vectors, such as multiply and add vectors, include equivalent inputs (e.g., attribute values), the operations may be fused or transformed into one compressed multiple attribute vector, for example, including fused MADD operations. Other operations, different from multiply and add, may be used to operate on data elements. For example operations may include power functions, polynomial functions of any degree, exponential functions, logarithmic functions, sine and/or cosine functions and/or other functions and combinations thereof. The two or more equivalent attribute values (e.g., retrieved from memories 2, 4, and/or 10) may be fused or compressed and used as one input. The fused or compressed input may be used and/or stored as a scalar value and broadcast to appropriate arithmetic logic units (ALUs) of a processor (e.g., processors 40, 60, 70, and/or 80). Two or more inputs (e.g., attribute values vector A and attribute values vector C) may be replaced with the single fused or compressed input (e.g., attribute value (A,C)). For example, only two vector sources (e.g., attribute values vector (A,C) and attribute values vector B) may be used to specify three inputs (e.g., attribute values A, B, and C). By compressing the input vectors, for a set of instructions (e.g., in the MADD equations), the third encoded pointer, which may otherwise be unavailable (e.g., used to represent an attribute value), may be used for specifying a unique destination. Thus, the number of inputs overwritten during the encoding process may be substantially reduced, for example, relative to inputs lost during conventional encoding operations.

An operation may be used for interpolating each of two or more data elements each having common input (e.g., values (e.g., A and C)) by preserving the common input values. For example, for a 4×4 data element tile, a 16 unit wide vector operation or set of instructions using, for example, multiply and/or add units, may be applied for interpolating data elements having similar x values and the same A and C attribute constants, for example, as follows:

```
Dest = [A]*x + [C]; // duplicate the 32 bit "A" value 16 times as input
Dest = Dest + [B]*y; // duplicate the 32 bit "B" value 16 times as input
```

Assembly code corresponding to each of the above vector operations may be written, for example, as follows:

```
vmadd233ps v0, v1, [A__C__continguous]{4to16} ;; v1 = x
vmadd231ps v0, v2, [B]{1to16}                  ;; v2 = y
```

While specific instructions, unit, data item size and group sizes are described, these are to provide example only, and others may be used. For example, values need not be 32 bits. Although attribute values are described, any values may be represented, used, interpolated, and/or input. Although a set of instructions are described herein that include multiply, add, or MADD operations, the set of instructions may additionally or alternately include any suitable operation, including, for example, vector operations, such as, vector multiplication or vector division, divide by square-root, matrix-vector multiplication, dot-product functions, elementary functions, trigonometric functions, power functions, logarithm functions, and/or a combination or transformation thereof. For example, an operation 206 (e.g., a MADD operation) may use vector inputs (e.g., three (3) vector inputs), which may be real or derived. A compressed MADD vector may, for example, be v3=v1*v2+v3, or for example, v1=v3[0]*v2[i]+v3[1] for i=0 to 16.

Figure 5:
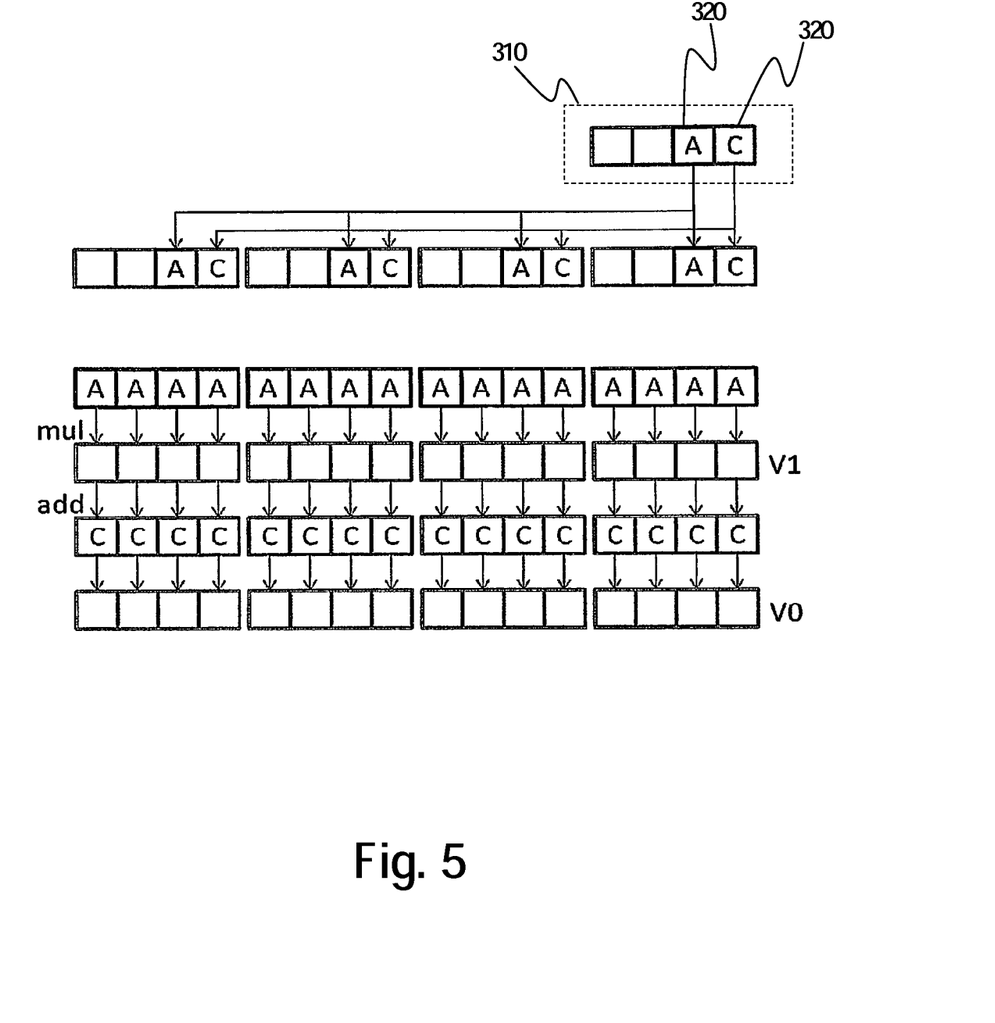
FIG. 5 is a schematic illustration of the application of a vector according to an embodiment of the invention.

Reference is made to FIG. 5, which schematically illustrates the application of a vector, e.g., compressed multiple attribute vector 310 (e.g., [A]*x+[C]), simultaneously expressing two or more attributes (e.g., values A and C) for each of two or more data points having common the same two or more attributes according to an embodiment of the invention. Although the two or more data points may have additional common attribute values, such as, B, this is not a requirement. Although specific attribute values A and C are described in a combined form, this selection is only one of several choices. For example, attribute value B may be used in a combined form as well, for example, with attribute values A and/or C.

In one embodiment, a compressed multiple attribute vector 310 may be a single vector (e.g., having a size of 512 bits) representing two or more attribute values (e.g., A and C). Compressed multiple attribute vector 310 may include data fused from two or more conventional single attribute vectors 320, each of which represents a single attribute value (e.g., A and C, respectively). Using compressed multiple attribute vector 310 for each data point having the same two or more attribute values A and C (e.g., in marked region 208), may simultaneously input each of the multiple attributes of the data points (e.g., for applying operations, such as graphics and/or pixel shading effects).

Embodiments of the invention may minimize the number of operations, iterations, and/or operational cycles used to apply operations 206 by collectively inputting and processing multiple attributes using compressed vector 310 (e.g., representing the multiple attributes in a single vector). In one embodiment, the compressed or fused vector may be input into a set of instructions for operation 206 to simultaneously (e.g., in the same instruction or clock cycle) operate on a number, N, of common attributes (e.g., N ? 2) to reduce the number of operational cycles for executing the set of instructions, for example, by a number (e.g., N-1). In one example described herein, the interpolation vector having 3 instructions may by compressed to 2 instructions, which may result in a reduction from 3 to 2 operation cycles. Other or different benefits may be achieved.

Although a specific set of instructions are described to operate on data elements, for example, by interpolating attributes for pixels or pixilated graphics, any suitable set of instructions or vectors may be used, including, for example, for evaluating large functions, line equations or linear functions (e.g., to determine where a data element such as a pixel may be located, such as, at the beginning or end of a pixel line), polynomial functions any degree or power, exponential functions, logarithmic functions, sine and/or cosine functions and/or other functions and combinations thereof. For example, the efficiency of a computing system using compressed vectors for solving functions as described herein may increase as the degree, size, and/or complexity of the functions increases. For example, for solving a complex algebraic function according to one embodiment of the invention, a set of operations may be executed (e.g., by an ISA) to generate a Taylor expansion of the function, store the Taylor constants in memory as a single compressed scalar value, and evaluate the nth degree polynomial using one clock cycle and one register location for each of the n degrees. Other or different benefits may be achieved.

Figure 6:
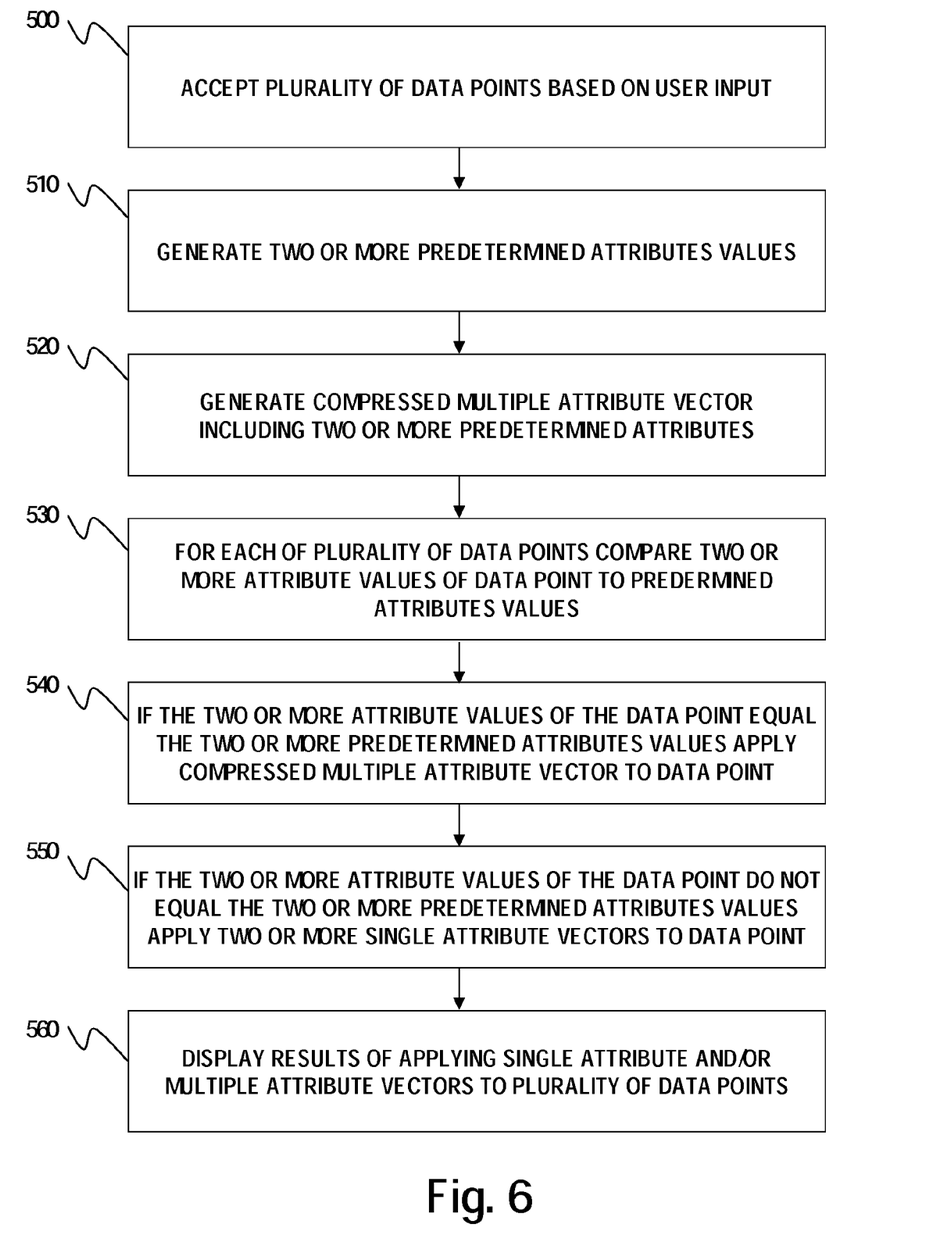
FIG. 6 is a flow chart of a method according to an embodiment of the invention.

Reference is made to FIG. 6, which is a flow chart of a method according to an embodiment of the invention.

In operation 500, a processor (e.g., one or more of processors 40, 60, 70, and/or 80, described in reference to FIGS. 1 and 2) may accept a plurality of data points (e.g., pixels in a pixilated image) having approximately the same attribute values. The set of data points may include or span a selected region of the set of data elements or image. Each data point may be defined, for example, by coordinate values (e.g., x and y) and two or more attribute values (e.g., A, B, and C). In one embodiment, the data elements may include pixels or other graphic elements. However, in other embodiments, the data elements may include any or all data objects, of any size and for any use.

In operation 510, the processor may generate two or more predetermined attribute values (e.g., A' and C'). The predetermined attribute values may include attribute values of one or more representative data points of the plurality of data points. In one embodiment, for example, the predetermined attribute values may be an average of the attribute values of the plurality of data points. In another embodiment, the plurality of data points may form a region, the representative data points may be located at or near a boundary of the region, and the predetermined attribute values may be the attribute values of the representative boundary data points. In yet another embodiment, the predetermined attribute values may be the attribute values of representative data points at or near the center or midpoint of the region. Other representative data points and/or predetermined attribute values may be used.

In operation 520, the processor may generate a multiple attribute vector, which may be a single compressed vector that may include or represent two or more predetermined attribute values (e.g., attribute values A' and C'). In one embodiment, the single (e.g., multiple attribute) compressed vector representing both a first and a second attribute may be a compressed or fused union of two (e.g., single attribute) vectors, such as for example, a first vector representing a first attribute and a second vector representing a second attribute.

The single compressed vector may be generated for applying operations, such as, for example, graphics effects or pixel shading effect, to each of the plurality of data elements or points. Other or different operations, such as, realism, bump mapping, shadows, and explosion effects, or other effects for non-graphic or pixel elements may be used. In one embodiment, the processor may generate the single compressed vector using a fused MADD hardware. Other or different hardware of software may be used. The attribute values may be combined into a single compressed vector for any set of instructions or operations, including for example, vector addition, vector multiplication, vector division, MADD, divide by square-root, matrix-vector multiplication, dot-product functions, elementary functions, trigonometric functions, power functions, logarithm functions, and or any combination thereof.

In operation 530, for each of the plurality of data points (e.g., accepted by the processor in operation 500) the processor may compare the attribute values of the data point (e.g., A and C) with the predetermined attribute values (e.g., A' and C'). If the two or more attribute values of the data point are approximately equal to the two or more predetermined attribute values, a process may proceed to operation 540; otherwise the process may proceed to operation 550.

In operation 540, the processor may input the single compressed vector (e.g., generated in operation 510) to simultaneously operate on (e.g., interpolate) the two or more attributes of the data point in a single operation, for example, in the same instruction or clock cycle. A local and/or register memory may store the compressed vector (e.g., during operations 530 to 540 for each of the plurality of data points). In one embodiment, the processor may input or use the compressed (e.g., multiple attribute) vector once for each of a plurality of data points having the same values for each of a first and second (e.g., two or more) attributes. A process may proceed to operation 560.

In operation 550, the processor may input two or more vectors to the data point, where each of the two or more vectors may include a single distinct attribute value of the data point. For example, one vector may include attribute value A and another vector may include attribute value C. In one embodiment, both vectors are used (e.g., in two or more distinct operations or applications) to process the data point.

In operation 560, a display (e.g., display 200, described in reference to FIG. 4) may display, for example, to a viewer the results of applying the set of instructions and/or inputting the vectors (e.g., the compressed multiple attribute vector and/or the single attribute vectors) to the plurality of data points, via a user interface (e.g., user interface 202, described in reference to FIG. 4). For example an image processed using the vectors may be displayed to a user.

The compressed multiple attribute vector may be stored in memory, such as for example, in cache memories, 42 and 62, and/or system or external memories 2, 4, 10 and/or other memories. Operations 206 may apply effects, such as, realism, bump mapping, shadows, and explosion effects, to data elements, for example, by using the compressed multiple attribute vector. The effects may be viewable or displayed to a user on a display (e.g., display 200) via a user interface (e.g., user interface 202). In other embodiments, the results of the applied operations may be part of a larger process and may be transparent, seamless, and/or hidden from a user. Further, the resulting data points or elements, such as modified graphics or images, may be stored. Other hardware of components may be used.

Other operations or series of operations may be used.

Embodiments of the invention may include a computer readable medium, such as for example a memory, a disk drive, or a universal serial bus (USB) flash memory, including instructions which when executed by a processor or controller, carry out methods disclosed herein.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A computer-implemented method in a process for adjusting a computer generated object image, the method comprising:
   generating a single compressed vector including two or more representative attribute values, respectively having associated representative data boundary values;
   if for each of a plurality of data points, at least a first attribute value of the data points and a second attribute value of the data points are approximately equal to a first and second, respectively, of the two or more representative attribute values by each being between the associated representative data boundary values, using the single compressed vector as an operand in a single-instruction vector operation that duplicates each of the two or more representative attribute values to operate on each of the plurality of data points; and
   if for each of the plurality of data points, the first and second attribute values of the data points are not approximately equal to the first and second, respectively, of the two or more representative attribute values by not all being between their associated representative data boundary values, using two or more vectors each including a single distinct attribute value as operands in a series of two or more single-instruction vector operations to operate on the plurality of data points.

2. The computer-implemented method of claim 1, comprising displaying to a viewer the results of using the compressed vector to operate on the data points.

3. The computer-implemented method of claim 1, wherein each of the representative attribute values are an average of the respective attribute values of the plurality of data points.

4. The computer-implemented method of claim 1, wherein the representative attribute values are the attribute values of one or more representative data points of the plurality of data points.

5. The computer-implemented method of claim 4, wherein the plurality of data points form a region and the representative data points are located at a boundary of the region.

6. The computer-implemented method of claim 1, wherein the data points comprise pixels.

7. The computer-implemented method of claim 6, wherein operating on the data points includes applying a pixel shading effect thereto.

8. The computer-implemented method of claim 1, wherein the single-instruction vector operation using the compressed vector is a fused multiply-add vector operation.

9. The computer-implemented method of claim 8, wherein a first of the two or more representative attribute values of the compressed vector is broadcast responsive to the single-instruction vector operation to be multiplied with coordinate values for each of the plurality of data points to produce a corresponding plurality of products, and a second of the two or more representative attribute values of the compressed vector is broadcast responsive to the single-instruction vector operation to be added with each of the corresponding plurality of products.

10. A computer-implemented method in a process for adjusting a computer generated object image, the method comprising:

compressing a first vector and a second vector representing a first attribute and a second attribute, respectively, into a single compressed vector representing both the first and second attributes; and using the compressed vector as a vector operand for a plurality of data points each having the same values, respectively, for the first and second attributes to execute a single vector instruction applying the compressed vector by duplicating the first attribute and the second attribute to operate on each of the plurality of data points.

11. The computer-implemented method of claim 10, comprising storing the compressed vector in memory.

12. The computer-implemented method of claim 10, comprising displaying to the user the results of executing the instruction.

13. The computer-implemented method of claim 10, wherein executing a set of instructions includes applying a pixel shading effect.

14. The computer-implemented method of claim 10, wherein each of the first and second attributes is selected from one of a group consisting of the following: RGB levels, intensity, contrast, and shadows.

15. The computer-implemented method of claim 10, wherein applying a vector to a plurality of data points comprises generating a vector product of the vector and the data points.

16. The computer-implemented method of claim 15, wherein applying the compressed vector is used to apply a pixel shading effect to each of the plurality of data points.

17. The computer-implemented method of claim 10, wherein the vector instruction applying the compressed vector to each of the plurality of data points is a fused multiply-add vector instruction.

18. The computer-implemented method of claim 17, wherein applying the compressed vector to each of the plurality of data points comprises:

broadcasting the first attribute of the compressed vector responsive to the vector instruction to be multiplied with a coordinate for each of the plurality of data points to produce a corresponding plurality of products, and broadcasting the second attribute of the compressed vector responsive to the vector instruction to be added with each of the corresponding plurality of products.

19. A system comprising:

a processor to generate a single compressed vector including two or more predetermined attribute values, respectively, having associated representative data boundary values, and to use:

the single compressed vector in a single-instruction vector operation by duplicating the two or more predetermined attribute values to operate on each of a plurality of data points values if for each of the plurality of data points, a first and second attribute values of the data points are approximately equal to a first and second, respectively, of the two or more predetermined attribute values by each being between the associated representative data boundary values; and two or more vectors each including a single distinct attribute value of the data points to operate on the data points in two or more single-instruction vector operations if the first and second attribute values of the data point are not approximately equal to the first and second, respectively, of the predetermined attribute values by not all being between the associated representative data boundary values; and a memory to store the plurality of data points.

20. The system of claim 19, comprising a display to provide to a viewer the results of operating using the compressed vector.

21. The system of claim 19, wherein the data points comprise pixels.

22. The system of claim 19, wherein each of the predetermined attribute values are an average of the respective attribute values of the plurality of data points.

23. The system of claim 19, wherein the predetermined attribute values are the attribute values of one or more representative data points of the plurality of data points.

24. The system of claim 23, wherein the plurality of data points form a region and the representative data points are located at a boundary of the region.

25. The system of claim 19, wherein the single-instruction vector operation using the compressed vector is a fused multiply-add vector operation.

26. The system of claim 25, wherein a first of the two or more predetermined attribute values of the compressed vector is broadcast responsive to the single-instruction vector operation to be multiplied with coordinates of each of the plurality of data points to produce a corresponding plurality of products, and a second of the two or more predetermined attribute values of the compressed vector is broadcast responsive to the single-instruction vector operation to be added with each of the corresponding plurality of products.

* * * * *